J. R. GRAFT.
SILO.
APPLICATION FILED DEC. 15, 1910.

1,021,718.

Patented Mar. 26, 1912.
2 SHEETS—SHEET 1.

Witnesses
A. G. Hague
W. A. Loftus

Inventor
John R. Graft,
by J. Ralph Drunig Atty

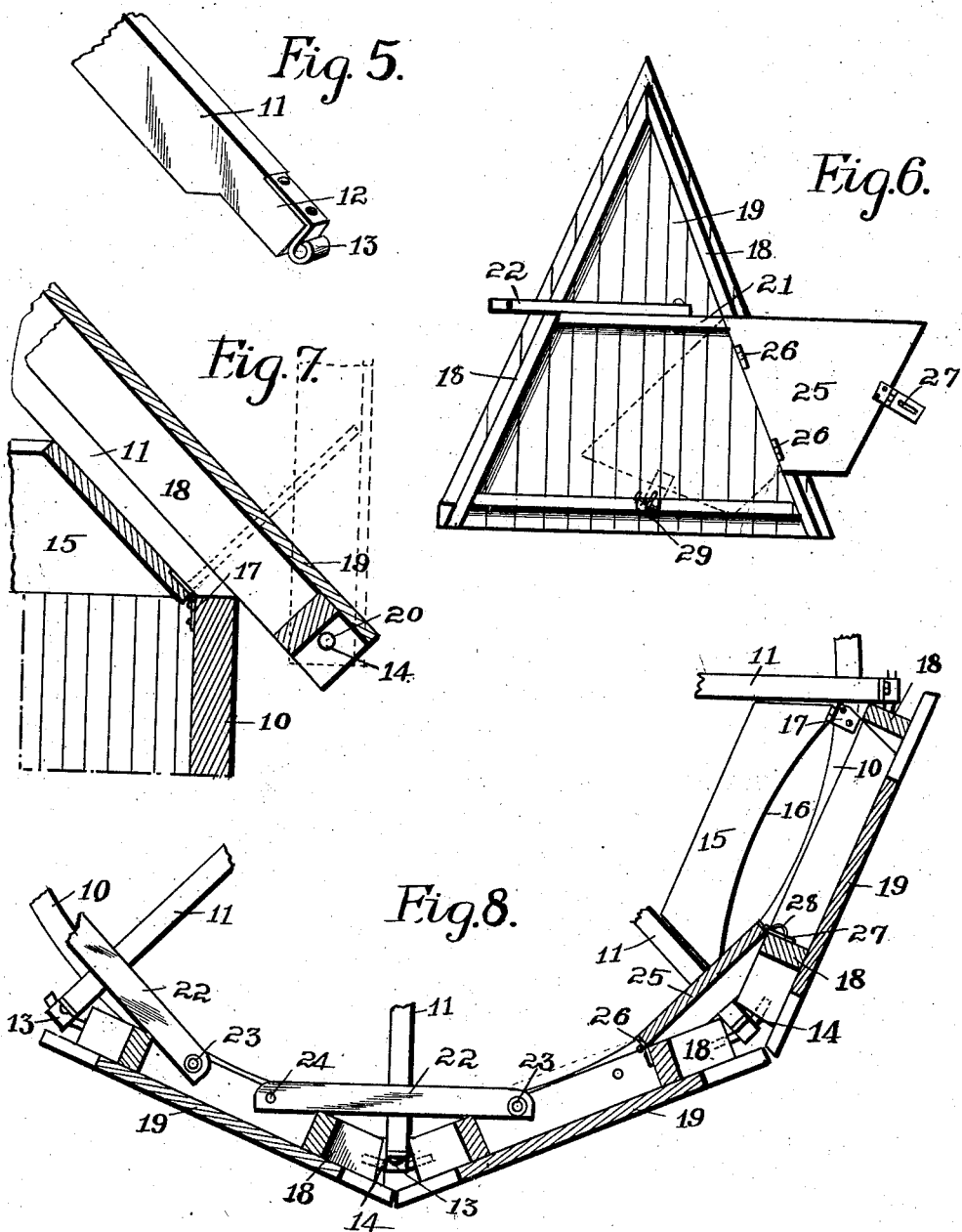

UNITED STATES PATENT OFFICE.

JOHN R. GRAFT, OF CEDAR RAPIDS, IOWA.

SILO.

1,021,718. Specification of Letters Patent. Patented Mar. 26, 1912.

Application filed December 15, 1910. Serial No. 597,549.

*To all whom it may concern:*

Be it known that I, JOHN R. GRAFT, a citizen of the United States, residing at Cedar Rapids, in the county of Linn and State of Iowa, have invented a certain new and useful Silo, of which the following is a specification.

The object of my invention is to provide a device of simple, durable and inexpensive construction designed to be attached to the top of the silo for the purpose of forming extension sides for the silo by which the capacity of the silo for receiving ensilage may be materially increased; and also to provide a device of this kind by which, after the ensilage has settled and become packed, the extension side members may be folded over the top of the silo to form a roof.

Figure 1:
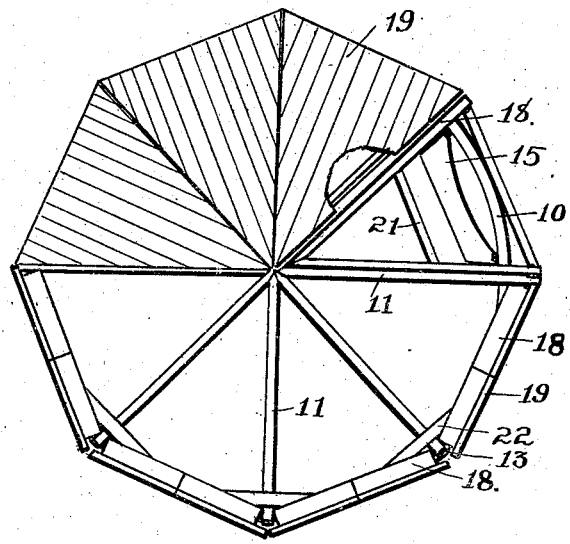
Figure 3:
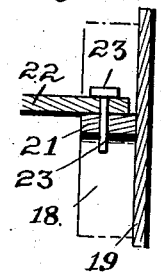
Figure 2:
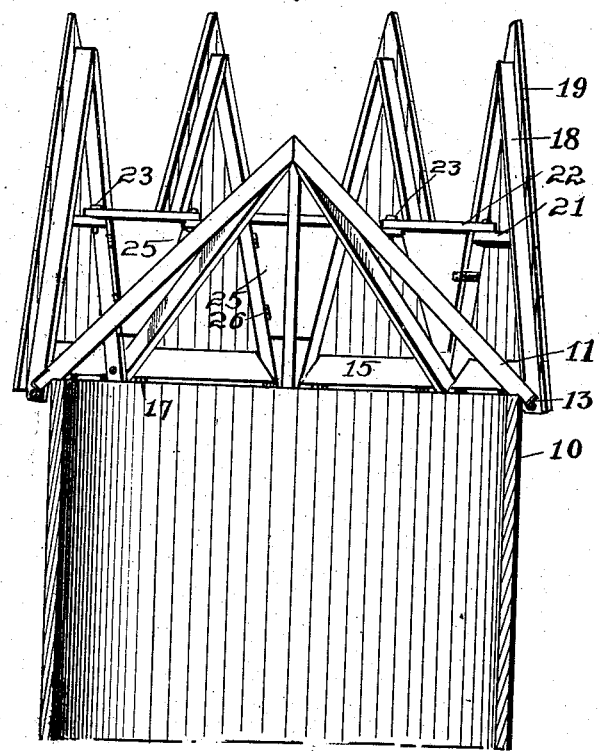
Figure 4:
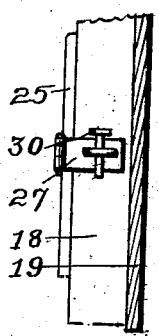

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a silo having my improvements applied thereto, some of the roof sections being shown in vertical positions to form extension sides and some of the roof sections being shown in closed positions to form a roof. Fig. 2 shows a vertical, central, sectional view of the upper end portion of a silo with my improved attachment applied thereto, the roof members being shown in vertical positions to form extension sides. Fig. 3 shows a detail, sectional view illustrating the means for pivoting the braced bars to the roof sections. Fig. 4 shows a detail, sectional view illustrating the means for detachably connecting the filling member at one end with a roof section. Fig. 5 shows a detail, perspective view of the lower end of one of the rafter members. Fig. 6 shows an inner face view of one of the roof sections, the filling member being shown extended laterally therefrom and also shown by dotted lines in its folded position. Fig. 7 shows a detail, sectional view of a part of the upper end of a silo and a part of one of the folding roof members thereon, and a part of one of the aprons hinged to the silo to fill the space between the roof sections and the silo when the roof sections are in position to form extension sides. The dotted lines in said figure show the roof section and said apron in their upwardly and outwardly extended positions, and Fig. 8 shows a horizontal, sectional view through a number of the roof sections and filling members illustrating the said roof sections in their vertically arranged positions to form extension sides; and also illustrating the means for connecting said sections and supporting them in their vertical positions.

Referring to the accompanying drawings, I have used the reference numeral 10 to indicate that portion of the silo shown. The silo itself is of the ordinary construction. Mounted on top of the silo is a series of rafters 11 fitted near their ends on top of the silo and each being provided with an extension 12 at its lower end having a metal loop 13 attached thereto. In each of the loops 13 is a pivot pin 14, as shown in Fig. 8, which extends in both directions from the loop. Between the lower ends of each pair of rafters is an apron comprising a body portion 15 with its lower edge curved, as shown in Fig. 8, at 16 and connected by hinges 17 with the top of the silo. This apron is of a size and shape to fit between the adjacent rafters and to be capable of being swung to position upwardly and outwardly inclined as shown by dotted lines in Fig. 7, and when in this position to have its lower edge fit against the top of the silo. Said apron may also swing downwardly to position close to the sides of the silo on the interior thereof.

I provide a number of independent roof sections, each being designed to fit between a pair of rafters. Each of these roof sections is triangular in shape and comprises a triangular frame 18 and a triangular roof portion 19, the edges of the roof portion being preferably projected beyond the frame as clearly shown in Fig. 6. At the lower ends of the frame are openings 20 shown in Fig. 7 to receive the pivot pins 14 to thereby pivotally connect the roof sections with the rafters, thus permitting the roof sections to swing from position for use as a roof where the roof member rests on top of the rafters to substantially vertical positions as shown by dotted lines in Fig. 7. At or near the center of each of the frames 18 is a cross brace 21 and pivoted to said cross-brace is a connecting bar 22, said parts being connected by the pivot pin 23 as shown in Fig. 3. This connecting bar 22 is of such length that when two adjoining roof sections are moved to vertical positions said bar may be extended across from one roof section to the other, as shown in Fig. 8, and the other end may be connected by a pin 24 with the cross bar 21 of the adjacent roof section, thus firmly holding and bracing said adjoining roof sections against either inward or outward movement. When it is desired to fold the roof sections downwardly the pin 24 is removed and the connecting bar is then swung to position adjacent to the roof section to which it is pivoted, thus permitting said roof section to be swung downwardly to rest upon the rafters.

It will be apparent, as illustrated in Fig. 2, that when the triangular roof sections are supported in vertical positions there will be V-shaped spaces between the sections through which the ensilage might pass out. In order to close these spaces and prevent ensilage from passing out between the roof sections, I have provided a series of filling members, one for each roof section, each filling member comprising a substantially triangular shaped body portion 25 connected by hinges 26 with the frame member 18, and provided on the edge opposite from the hinges with a latch device 27. When this filling member is moved outwardly to the position shown in Figs. 2 and 6, it will fill the lower portion of the space between the roof members to a point adjacent to the top of the adjoining rafter member; the said latch device 27 is so arranged that it may be swung over a loop 28 on the frame 18 of an adjoining roof member, as shown in Fig. 8, to thereby hold this filling member in position. A second similar loop 29 is provided at the bottom of the roof member to receive said latch device when the filling member is folded over on the under side of the roof member as shown by dotted lines in Fig. 6. When the filling member is in its position between the two upright roof sections it may be held in such position by a pin 30 through the loop 28 as shown in Fig. 4.

In practical use it is one of the advantages of my invention that the various roof sections may be manufactured independently at the factory where the silos themselves are made and they may be packed and shipped ready to assemble when the silos are constructed. Heretofore it has been a considerable item of extra expense to manufacture a roof separately from the silo and place it in position after the silo has been erected. In erecting the roof device I first place the rafters in position in an ordinary manner and then hinge the roof sections to the rafters by inserting the ends of the pins 14 in the openings 20. Then the apron members 15 are hinged in position on top of the silo between the rafters.

When it is desired to fill the silo with ensilage the roof sections are swung one at a time to vertical position. When the sections are moved to vertical position the operator applies the connecting bar 22 and inserts the pin 24 to thereby securely hold the roof sections in their upright positions. He then also swings the adjacent filling members 25 to their open positions and connects them to the adjacent roof sections. The apron 15 may also be swung upwardly and outwardly so that its end rests against the roof section. When all of the roof sections have thus been elevated and connected and the filling members and aprons placed in position the said roof sections combined form an extension for the top of the silo and they also provide an open top silo through which ensilage may be inserted in the ordinary way. The filling members 25 prevent the ensilage from passing out between the roof members and the aprons 15 prevent it from passing out between the top edge of the silo and the adjacent portions of the roof members which are necessarily spaced apart slightly from the outer edge of the silo especially at their side edges. The silo may then be filled up to a point at or above the tops of the filling members 25 thus increasing to a considerable extent the holding capacity of the silo.

It is well known that the ensilage in a silo will, within a short time, settle to a very considerable extent and I preferably provide filling members of such height that when the ensilage is filled up to a point substantially flush with their upper edges it will, when it is settled, be just slightly below the top of the silo so that the entire silo may be filled with ensilage after the ensilage has settled. As soon as the ensilage has settled to a point below the top of the silo then the operator may fold the aprons 15 downwardly within the silo, then place the filling members 25 one at a time against the inner surface of the roof member to which it is hinged and then disconnect the bars 22 one at a time and permit each section to swing downwardly to position resting upon the rafters. When this has been done a solid, strongly braced roof is provided between the roof members and the top of the silo. Inasmuch as all of the parts are permanently connected to the silo they are not likely to become lost.

I claim as my invention:

1. The combination of a silo having rafters extending radially from a point above the center of the upper end of the silo frame downwardly and outwardly to said frame, with a plurality of triangular roof sections, and means for hinging said roof sections to said rafters near their lower ends, so that said roof sections in one position of their movement coact to form a roof of greater circumference than the silo and in another position thereof rest in vertical position to form extensions of the silo wall.

2. The combination of a substantially round silo having rafters extending radially from a central point above the upper end of the silo frame downwardly and outwardly to points outside of said frame, said rafters being secured to said frame, with a plurality of triangular roof sections, means for hinging said roof sections to said rafters near their lower ends, said roof sections being of such form and hinged at such points on said rafters that in one position of their movement, they coact to form a roof of greater circumference than the silo, and in another position of their movement rest in vertical position to form extensions of the silo wall.

3. The combination with a silo, of a series of substantially triangular shaped roof sections pivotally supported near the top of the silo and capable in one position of extending inwardly adjacent to each other to form a roof and also capable of being extended upwardly from the edges of the silo to form extension sides for the silo, and means for filling the space between the roof sections when in their upright positions, said means comprising filling members hinged at one edge to one of the roof members and capable of swinging from position adjacent to the under surface of said roof member outwardly to position extending across the space between the roof member to which it is connected and the adjacent one.

4. The combination with a silo, of a series of substantially triangular shaped roof sections pivotally supported near the top of the silo and capable in one position of extending inwardly adjacent to each other to form a roof and also capable of being extended upwardly from the edges of the silo to form extension sides for the silo, means for filling the space between the roof sections when in their upright positions, said means comprising filling members hinged at one edge to one of the roof members and capable of swinging from position adjacent to the under surface of said roof member outwardly to position extending across the space between the roof member to which it is connected and the adjacent one, and means for holding said filling members in both of the said positions.

5. In combination with a silo, a roof comprising substantially triangular roof sections hinged at a point outside the upper end of the silo and capable in one position of their movement of coacting to form a roof, and in another position of their movement of extending upwardly to form extensions of the silo wall, means for preventing ensilage from dropping between the roof sections and the silo wall, on the inside of the latter, when the roof sections are in their raised position, said means being secured to the silo frame and being capable of movement out of the way of the roof sections when the latter are closed.

6. The combination of a silo, with a plurality of roof sections substantially triangular in shape hinged near the top of the silo and capable in one position of their movement of coacting with each other to form a roof, and in another position of their movement of forming upright extensions of the silo wall, means for filling the spaces between the roof sections when they are in their upright positions, sectional aprons designed to prevent ensilage from falling between the roof sections and the outside of the silo wall when the roof sections are in their upright positions, each section of said aprons being hinged to the upper part of the silo frame and capable of hanging downwardly adjacent to the inner surface of the silo wall and also of swinging outwardly and upwardly against the roof sections, the hinged edges of said apron sections being constructed to fit the upper part of the silo wall when said apron sections are in their raised positions.

7. The combination of a silo, with a plurality of roof sections substantially triangular in shape hinged near the top of the silo and capable in one position of their movement of coacting with each other to form a roof, and in another position of their movement of forming upright extensions of the silo wall, means for filling the spaces between the roof sections when they are in their upright positions, sectional aprons designed when in their upright positions to prevent ensilage from falling between the roof sections and the outside of the silo wall, or upon the top of the silo wall, each section of said aprons being hinged to the upper part of the silo frame and capable of hanging downwardly adjacent to the inner surfaces of the silo wall and also of swinging outwardly and upwardly against the roof sections, so that when the roof sections are moved inwardly from their upright positions they will push said aprons past the point of gravity and the latter will then swing to their lower positions.

8. The combination with a silo, of a series of substantially triangular shaped roof sections pivotally supported near the top of the silo and capable in one position of extending inwardly adjacent to each other to form a roof and also capable of being extended upwardly from the edges of the silo to form extension sides for the silo, and an apron pivoted to the silo adjacent to each roof section and capable of swinging upwardly and outwardly against said roof section when it is in a substantially upright position.

9. The combination of a substantially round silo having rafters extending radially from a central point above the upper end of the silo frame downwardly and outwardly to points outside of said frame, said rafters being secured to said frame, with a plurality of triangular roof sections, means for hinging said roof sections to said rafters near their lower ends, said roof sections being of such form and hinged at such points on said rafters that in one position of their movement, they coact to form a roof of greater circumference than the silo, and in another position of their movement rest in vertical position to form extensions of the silo wall, adjustable aprons designed in one position of their movement to extend from the inner side of the upper end of the silo wall, upwardly and outwardly to the said roof sections when the latter are in their raised positions.

10. The combination of a silo, of a series of rafter members connected at the central members and extended downwardly and outwardly and supported on top of the silo, a loop at the outer end of each rafter member, a series of substantially triangular roof members, each comprising a frame and a roof section fixed to the frame, said frames being inserted between the rafter members, and pins extended through said loops and through the frames to pivotally connect the frames with the rafter members, a supporting bar pivoted to each frame and capable of being detachably connected to the adjacent frame, a filling member pivoted to each frame and designed to fill the space between the frames when they are in substantially upright positions, means for securing said filling members to the adjacent frames, and aprons pivoted to the silo and capable in one position of filling the spaces between the roof members and the top of the silo between the ends of said rafters, substantially as and for the purposes stated.

Des Moines, Iowa, December 1, 1910.

JOHN R. GRAFT.

Witnesses:
MARY WALLACE,
M. B. PETERSON.

Copies of this patent may be obtained for five cents each, by addressing the "Commissioner of Patents. Washington, D. C."